United States Patent
Martens

(10) Patent No.: US 8,142,118 B2
(45) Date of Patent: Mar. 27, 2012

(54) WORKING MACHINE

(75) Inventor: Knut Martens, Mindelheim (DE)

(73) Assignee: Grob-Werke GmbH & Co. KG, Mindelheim (DE)

( * ) Notice: Subject to any disclaimer, the term of this patent is extended or adjusted under 35 U.S.C. 154(b) by 1081 days.

(21) Appl. No.: 11/889,692

(22) Filed: Aug. 15, 2007

(65) Prior Publication Data

US 2008/0045391 A1 Feb. 21, 2008

(30) Foreign Application Priority Data

Aug. 16, 2006 (DE) .................. 10 2006 038 499

(51) Int. Cl.
*B23C 5/26* (2006.01)
*B23Q 11/06* (2006.01)
*B23Q 17/12* (2006.01)
*B23Q 17/00* (2006.01)

(52) U.S. Cl. ........ 409/131; 409/141; 409/232; 409/214; 409/193; 408/9; 408/143; 33/639

(58) Field of Classification Search .......... 409/231–233, 409/210, 214, 218, 193, 194, 207–208, 141, 409/131–132; 408/8, 9, 143; 33/636–637, 33/639, 642
See application file for complete search history.

(56) References Cited

U.S. PATENT DOCUMENTS

| | | | |
|---|---|---|---|
| 5,971,682 A * | 10/1999 | Vig | 409/234 |
| 6,140,931 A | 10/2000 | Yamane et al. | |
| 6,409,641 B1 | 6/2002 | Hashimoto | |
| 6,752,031 B2 * | 6/2004 | Akamatsu et al. | 73/865.9 |
| 7,037,053 B2 * | 5/2006 | Matsumoto et al. | 409/234 |
| 2004/0029690 A1 * | 2/2004 | Takaku | 483/7 |

FOREIGN PATENT DOCUMENTS

| | | |
|---|---|---|
| DE | 1923668 | 9/1965 |
| EP | 1162030 | 12/2001 |
| EP | 1495835 | 1/2005 |
| EP | 1593456 | 11/2005 |
| JP | 02-243252 A * | 9/1990 |
| JP | 09-029577 A * | 2/1997 |

OTHER PUBLICATIONS

Machine Translation of JP-09-029577, which JP '577 was published Feb. 1997.*
Marks' Standard Handbook for Mechanical Engineers, 9th ed., pp. 5-83 through 5-84, 1987.*

* cited by examiner

*Primary Examiner* — Erica E Cadugan
(74) *Attorney, Agent, or Firm* — Jacobson Holman PLLC

(57) ABSTRACT

The invention refers to a working machine with a machining tool which can be set in a spindle head of a working spindle. A monitoring unit is provided which monitors the shape of the spindle head.

16 Claims, 4 Drawing Sheets

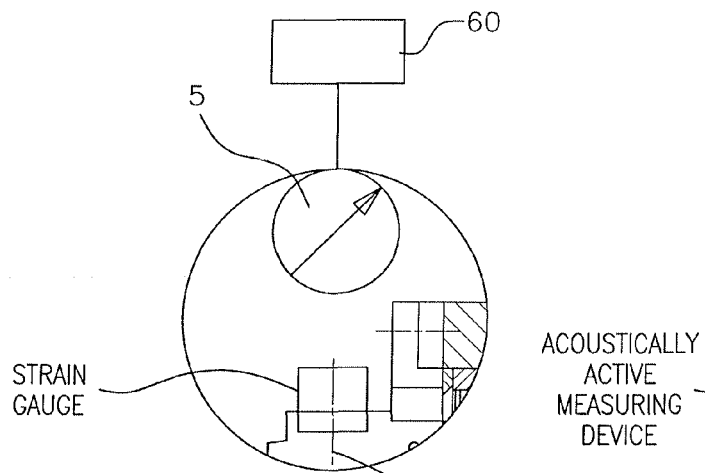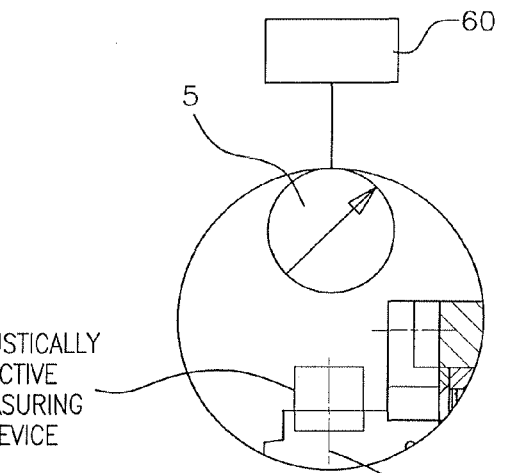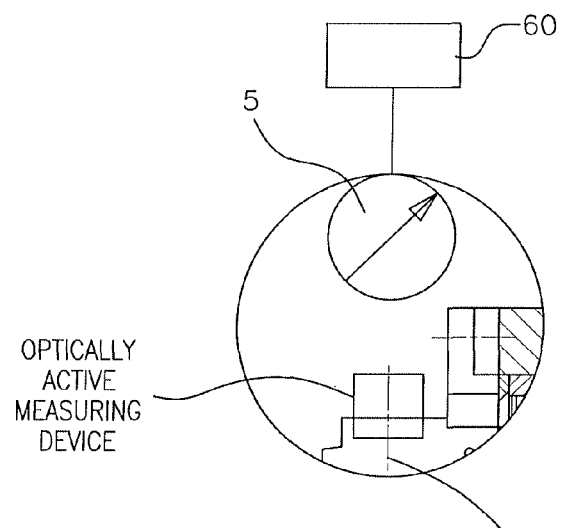

WORKING MACHINE

Figure 1:
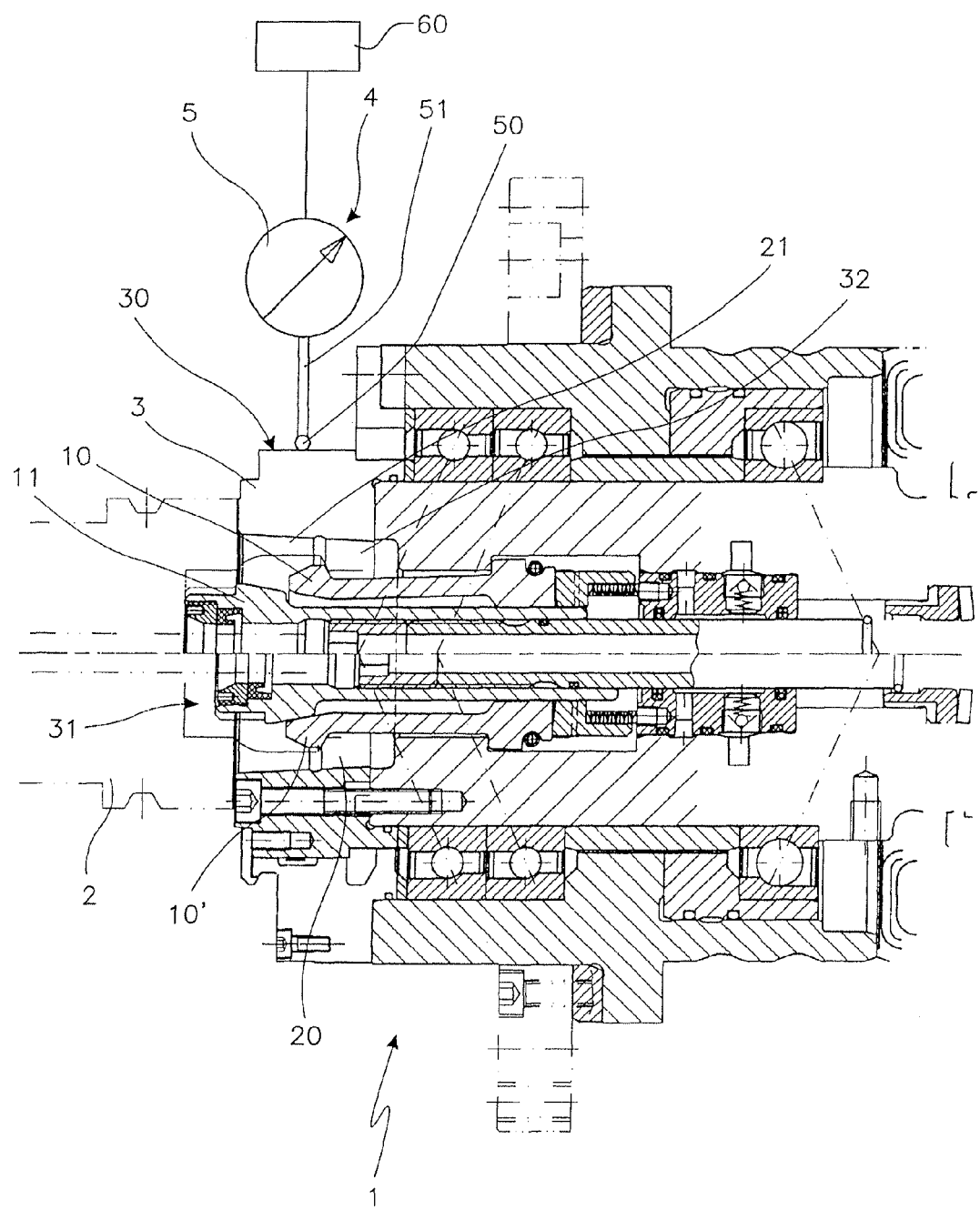

The invention refers to a working machine with a machining tool which can be set in a spindle head of a machining spindle.

BACKGROUND OF THE INVENTION

Working machines of the type mentioned before are used, for example, for the cutting machining of work pieces, for example in machining centers, machining stations or also in transfer lines. A high degree of machining accuracy is demanded of the working machines mentioned before.

The machining is carried out by machining tools which are set into rotation and positioned by machining spindles. By the cutting machining in the working room chips are whirled around which may be deposited at very different spots.

When a machining tool is changed there is the risk that impurities or chips may get in the spindle head of the machining spindle, between the tool shank and the tool holding device which may still allow clamping the machining tool in the machining spindle, however, interfere with the high machining accuracy which is demanded.

Suggestions have been presented which are supposed to monitor the correct seat of the machining tool on a plane contact surface at the spindle head, and, if the dimensions differ accordingly, prevent machining. Now, the jammed chips and impurities do not interfere with this plane contact, however, these impurities, if they are deposited at the spindle head and not at the plane contact surface, lead to a distinct faulty machining, for example by balance error, and, in the worst case the result of the work piece becomes a reject.

In the state of the art a measuring and monitoring device for the working machines is known where a sensor sensitive for pressure, clamping or force is provided in or under the plane contact surface. This sensor indicates whether the article to be clamped is positioned exactly.

SHORT SUMMARY OF THE INVENTION

Coming from this state of the art the invention has the object to provide a working machine as described in the beginning where the result is a reject quota as small as possible while the machining accuracy is as high as possible.

The problem presented in the beginning is solved by a working machine with a machining tool which can be set in the spindle head of a machining spindle, a monitoring device being provided which monitors the shape of the spindle head.

As already described in the state of the art measurements which monitor the correct close contact of the tool shank with the spindle head did not succeed in safely discovering the risk of a jammed chip. However, such a jammed chip leads to a deformation (for example radial) of the spindle head which can be monitored. The invention now suggests that the shape of the spindle head is monitored by a monitoring device, and, if a corresponding deformation is determined, a machining operation of the working machine is deleted, and, instead of that, first of all the machining tool is exchanged again, the tool holding device is cleaned or blown free, if necessary, and, after that, the clamping procedure of the machining tool is repeated.

Through the solution suggested according to the invention an impending rejection production because of the clamped machining tool which deforms the spindle head of the machining spindle is detected, and an impending rejection production is prevented reliably. In contrast to the state of the art, therefore, according to the invention, the shape or deformation of the spindle head is determined and detected, and then, if such deforming clamping has been detected, of course, removed accordingly. This is carried out by taking out the machining tool again and, after that, cleaning of the holding and contact surface. This is carried out preferably by either flushing or rinsing or blowing out or off.

In contrast to the state of the art therefore for determining whether the machining, because of a deforming clamping of the machining tool or because of a balance error caused by an impurity at the spindle head, is not possible, it is determined reliably that the machining tool is not clamped exactly or the spindle head is in such a condition that also a rejection production is impending.

Of course, according to the invention, recording the shape of the spindle head can be extended also to the shape of the machining tool. For that purpose a monitoring device can be provided additionally which additionally monitors the shape of the machining tool. Of course, in the monitoring device for monitoring the shape of the spindle head also a monitoring of the machining tool can be integrated. For example, in the design of a monitoring device as an optically or acoustically active measuring device such a monitoring can be extended without any problem to both machine components, namely the spindle head of the working spindle and the machining tool.

In a preferred modification of the invention the monitoring device comprises a measuring device. The measuring device serves for recording the shape of the spindle head. For this purpose it is, according to the invention, also possible with very small aberrations, namely when, for example, chips are in the holding device, e.g. in the cone of the spindle for the holding device of the machining tool, and this then leads to a deformation of the spindle head during the clamping operation, to determine this and to remove it. According to the invention it is possible here to use a number of very different measuring devices, which are suited for recording the shape of the spindle head, and, in particular, to determine and indicate changes of the form.

According to an advantageous development of the invention at least one measuring device is provided at the circumferential surface of the spindle head and/or at the circumference of the machining tool. Because of this arrangement it can be detected reliably whether the machining tool is not clamped exactly because of the clamping procedure or because of impurities, or whether there is a balance error or deformation at the spindle head.

A modification of the invention also suggests that the measuring device records or indicates oscillations or deformations occurring at the circumferential surface because of a balance error, and/or transfers them to a control, alarm or the like.

The recording of the shape of the spindle head by the measuring device is carried out here preferably contact-less. The expensive arrangement of suitable slide contacts on the rotating spindle head is not necessary with the modification according to the invention.

Besides the use of a measuring device which detects the shape of the spindle head contact-less, of course, also an arrangement is possible where the measuring device records the shape of the spindle head by a mechanic contact, for example with a highly accurate template or contact head.

In another modification according to the invention it is provided that as measuring device a mechanic dial gauge is used the probe of which is supported by the circumferential surface of the spindle head. The mechanic dial gauge, for example, is arranged on a positioning device and is positioned during the tool exchange procedure at the exterior surface of the circumferential surface. It has been found here that a mechanic dial gauge of this type already leads to acceptable, sufficient measuring results; the dial gauge has a corresponding rod assembly at the end of which a probe is arranged which records the shape of the spindle highly sensitively. In general it has to be assumed that, of course, the spindle head the shape of which has to measured is either machined highly precisely, or it is measured in its non-clamped contour, and is stored as target pattern in a storage. Conveniently here an arrangement is provided which makes it possible that the angle position of the spindle head can be separated. In such a procedure a corresponding highly accurate machining and also maintenance or coating of the circumferential surface may be done without.

In a modification according to the invention it is, for example, provided, that the measuring device is designed as wire strain gauge and is arranged on the spindle head. A jammed chip leads to a corresponding deformation of the spindle head or its circumferential surface or area surface, for example to a corresponding expansion. A wire strain gauge, which, for example, is applied in a photolithographic working step in a thin-layer technology on the spindle head, registers a corresponding strain by a corresponding increasing of the electric resistance. This changed electric resistance leads to an increased voltage drop while the current flow is constant which can be evaluated accordingly. Here, for example, a number of wire strain gauges are provided spaced apart along the circumference of the spindle head. A corresponding measuring signal is then transmitted, for example, wireless, and then evaluated.

Besides the described application of mechanic templates or electric measuring devices, for example by means of the wire strain gauge, of course also arrangements are possible where the measuring device has an inductive or a capacitive sensor. By means of inductive or capacitive sensors in particular also contact-less measuring and detecting of deformations or changes at the spindle head, and/or at the machining tool is possible. The inductive or capacitive sensors are very precise with regard to their accuracy, and detect even very small changes or deformations.

Furthermore also acoustically or optically active measuring devices are possible. For example, a measuring device designed in this connection for contact-less measuring can be used which measures waves (these may be either ultrasound waves or light waves) reflected by the spindle head, in order to detect corresponding deformations.

According to the invention the monitoring device furthermore comprises an evaluating device which is, if necessary, designed as part of the machine control of the working machine, and which evaluates the shape of the spindle head determined by the measuring device.

It is actually possible that very slight deformations of the spindle head can be tolerated, as these deformations do not yet lead to an unacceptable quality of machining. This means that within an acceptance interval the shape of the spindle head, even if it differs from the ideal shape, is accepted, and machining the work piece by the working machine is not interrupted. Therefore the monitoring device has cleverly an additional evaluating device, and it is then based on its evaluation whether a machining is carried out or not.

Preferably the invention is used with a cutting working machine or working machines which use cutting machining tools. Just with these working machines, on the one hand, the mentioned problem occurs more and more because it produces, because of its species, accordingly interfering chips. On the other hand, just with these cutting working machines the consequences of accordingly inaccurately clamped machining tools are considerable which then may lead to rejection productions. The invention is here not at all restricted to cutting working machines, actually there are also other working machines, for example assembly machines or also measuring devices or testing machines as working machines where suitable testing tools are set in suitable spindle heads, and also require accordingly high precision. In this connection the term working spindle or spindle head is in no way to be understood as restricted to a rotating drive, but it rather describes the possibility that by means of the working spindle the machining tool, which may be designed in any way, has to be positioned, as described, in any position with regard to the work piece.

The invention comprises furthermore not only a working machine as described, but the object according to the invention is also solved by a method for operating a working machine, where, first of all, a machining tool is set in the spindle head and is clamped there, then the shape of the spindle head is determined by the measuring device, the determined shape is evaluated by an evaluating device, and, if the shape is within an interval of acceptance, the machining of the work piece by the machining tool is carried out, or, if the shape is outside the interval of acceptance, the machining tool is removed from the spindle head, and at least the machining tool holding device in the spindle head is cleaned, in particular blown out. Through the method suggested by the invention a testing step is carried out which, on the one hand, determines in a measuring step determines the shape of the spindle head, and then, in an evaluation step tests whether the determined shape is acceptable, that means within an interval of acceptance which can be chosen in any way, if necessary, or whether it is outside of this interval of acceptance. If the determined shape is outside the interval of acceptance a further use of the working machine carries the risk of faulty machining, and it is then provided that the machining tool is removed again from the machining tool holding device of the spindle head, and then the holding device is cleaned. During the cleaning step then the chip or other impurities have to be removed, cleverly the tool holding device is blown out here or, if necessary, also rinsed with cooling or rinsing liquid. After that setting-in of the machining tool in the spindle head as well as the measuring or evaluating step is repeated one more time, and then machining is carried out if the shape is acceptable. If an acceptable shape still cannot be determined, by means of the control another rinsing can be provided or a superior error message is edited which leads to a corresponding checking of the working machine. The result is a very comprehensive protection against faulty machining and avoidable rejection by the suggestion according to the invention.

In another modification according to the invention it is provided that the shape of the spindle head is determined during a rotation, in particular during the running-up for following machining purposes. Such a procedure is convenient if, for example, a stationary arranged measuring device is used as described for example mechanically, electrically, optically. With other measuring devices it is, however, possible to check the shape of the clamping head during clamping the tool, and thus save accordingly time. Such a modification is, for example, the arrangement with the wire strain gauge. Cleverly here the rotation of the spindle head after setting-in the tool is used for running up the spindle, so that each position of the circumferential surface has to pass the sensor, and the circumferential surface can be evaluated for deformations accordingly. If necessary, a phase with slow rotational speed in the actual running-up for machining purposes is superposed in order to give the measuring device sufficient time for measuring.

It is decisive with the invention not to determine the exact shape of the spindle head, but to confirm whether a chip or other impurities are clamped in such a way so that this cannot lead to faulty machinings.

It is clear that the method described before cannot only be applied with cutting machining tools but, of course, in the same way with working machines which carry out assembling works or with working machines which are realised as testing machines. Just testing machines which have a corresponding control function require also a very high accuracy of position of the testing tool as machining tool, and here also the invention serves very well.

In this connection it is in particular pointed out that all characteristics and features described with regard to the device, but also methods, can be transferred accordingly also with regard to the formulation of the method according to the invention, and can be used in the sense of the invention, and are seen also as disclosed. The same goes vice versa, that means, constructive, that means device, characteristics only mentioned with regard to the method may also be taken into consideration in the frame of the device claims and be claimed and also count as part of the invention and disclosure.

SHORT DESCRIPTION OF THE DIFFERENT VIEWS AND DRAWINGS

In FIG. 1 the working machine according to the invention is shown schematically in a section in the region of the spindle head of the working spindle.

Figure 2:
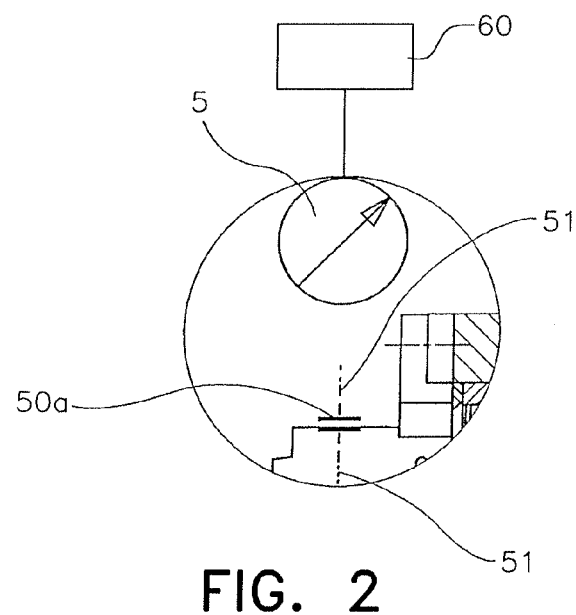
Figure 3:
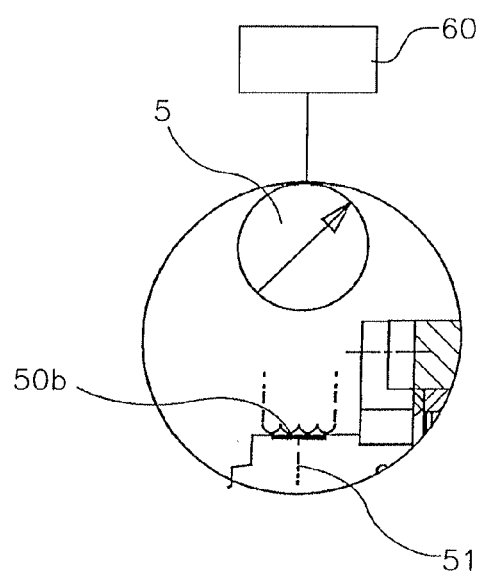

FIGS. 2 and 3 schematically illustrate the sensor 50 of FIG. 1 being a capacitive sensor 50a or an inductive sensor 50b.

FIG. 4 schematically illustrates the sensor 50 of FIG. 1 being a wire strain gauge.

FIG. 5 schematically illustrates the sensor 50 of FIG. 1 being an acoustically active measuring device.

FIG. 6 schematically illustrates the sensor 50 of FIG. 1 being an optically active measuring device.

Figure 7:
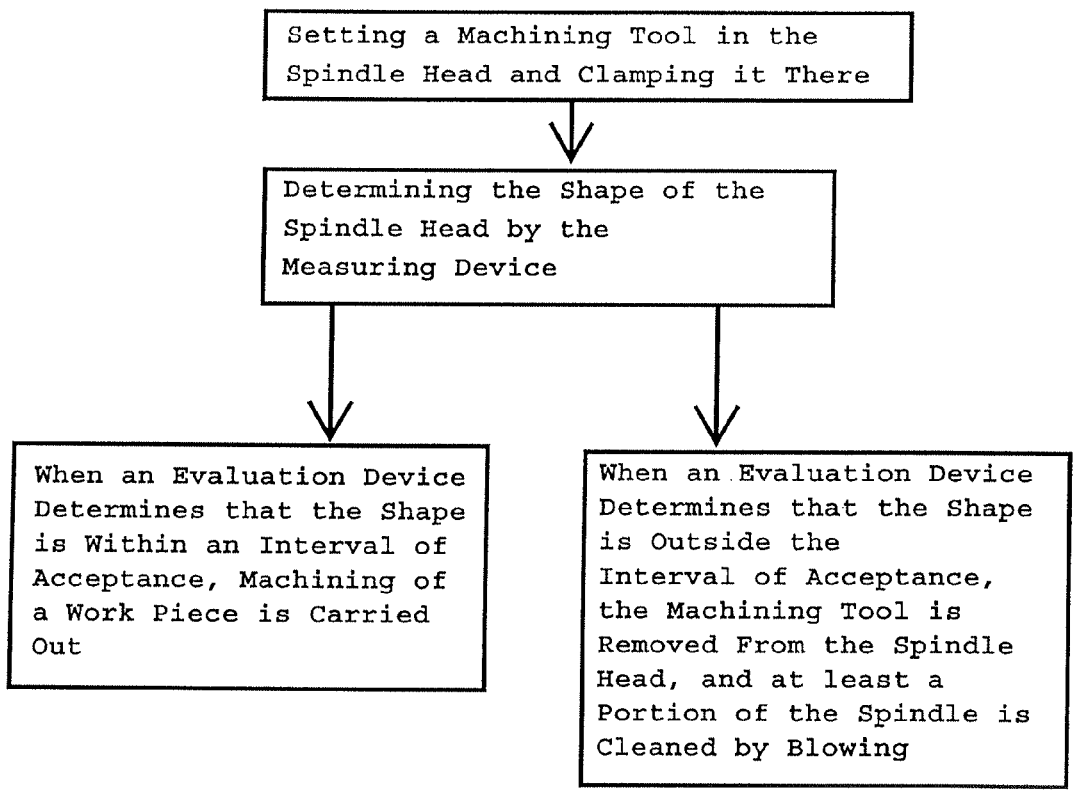

FIG. 7 is a flow chart illustrating a method according to the present invention.

DETAILED DESCRIPTION OF THE PREFERRED EMBODIMENT

FIG. 1 shows the front part of the working spindle 1 facing a not-shown work piece. At its front end the working spindle 1 carries on its spindle head 3 the machining tool 2. So-called hollow shank cone tools are known which are held by a clamping claw 10, 10'. In the clamped position of the clamping claw 10' the tool shank 20 is held in machining tool holding device 31 of the spindle head 3.

The exterior surface 21 of the tool shank is, if possible with the complete surface, in close contact with the interior surface 32 of the holding device of the spindle head. A chip in this region leads to a measurable deformation of the spindle head 3, in particular of its surface area or circumferential surface 30.

A measuring device 5 has a probe 50 or sensor 50 which monitors the shape of the spindle head 3 and the contour of the surface of the circumferential surface 30, which here has the same effect. The probe 50 or sensor 50 has a measuring line 51 in order to connect the measuring device 5, which is part of the monitoring device 4, with the probe/sensor 50. The measuring device 5 records and indicates, respectively, oscillations and deformations, respectively, occurring at the surface area or circumferential surface because of a balance error, and transfers these preferably to a control or an alarm 60.

Instead of the shown measuring device 5, however, it is also possible to use a mechanically operating dial gauge which has a mechanic rod assembly the front tip of which is designed as probe 50, and records corresponding deformations of the circumferential surface 30 and indicates them or makes them available for an evaluating unit. Scanning is carried out here only on a circumferential ring or on the complete circumferential surface.

If now a machining tool 2 is set in the machining tool holding device 31 the clamping rod 11 is pushed forward, the clamping claw 10 recedes radially toward the inward projecting collar of the hollow shank cone of the machining tool 2. If then the clamping rod 11' is moved to the right the clamping claw 10' reaches behind the collar at the machining tool and presses or draws the exterior surface 21 of the tool shank on the interior surface 32 of the holding device. The forces occurring here are considerable and are able to deform the spindle head measurably when a corresponding impurity, a chip or the like is in the space between the tool shank 20 and the machining tool holding device 31. This deformation is monitored by the monitoring device 4, the measuring device 5 determines the corresponding deformation, an evaluating unit not shown in detail checks whether the recorded shape is within the interval of acceptance or not.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. A working machine with a machining tool which can be set in a spindle head of a working spindle, a monitoring device being provided which monitors the shape of the spindle head, the monitoring device comprises a measuring device and the measuring device comprises a measuring head or a sensor arranged in such a way that the measuring device captures or indicates a deformation of a surface contour of a circumferential surface of the spindle head, caused by a chip in an area between outside of the tool and inside of the spindle.

2. The working machine according to claim 1, wherein the measuring device determines the shape of the spindle head contact-less.

3. The working machine according to claim 1, wherein as the measuring head, a mechanic dial gauge is provided, a probe of which is supported by the circumferential surface of the spindle head.

4. The working machine according to claim 1, wherein the sensor is an inductive or capacitive sensor.

5. The working machine according to claim 1, wherein the measuring head is designed as a wire strain gauge, and the wire strain gauge is arranged on the spindle head.

6. The working machine according to claim 1, wherein the measuring head is provided as an acoustically or optically active measuring device.

7. The working machine according to claim 1, further comprising an evaluating device, and the evaluating device evaluates the shape of the spindle head determined by the measuring device.

8. The working machine according to claim 1, wherein the machining tool is a cutting machining tool.

9. A method for operating the working machine according to claim 1, where, first of all, the machining tool is set in the spindle head and is clamped there via a machining tool holding device in the spindle head, then the shape of the spindle head is determined by the measuring device, the determined shape is evaluated by an evaluating device, and, if the shape is within an interval of acceptance, machining of a work piece by the machining tool is carried out, or, if the shape is outside of the interval of acceptance, the machining tool is removed from the spindle head, and at least the machining tool holding device in the spindle head is cleaned.

10. The method according to claim 9, wherein the cleaning of at least the machining tool holding device in the spindle head comprises blowing out the at least the machining tool holding device.

11. A method for operating the working machine according to claim 1, where, first of all, the machining tool is set in the spindle head and is clamped there in a machining tool holding device in the spindle head, then the shape of the spindle head is determined by the measuring device, the determined shape is evaluated by an evaluating device, and, if the shape is within an interval of acceptance, machining of a work piece by the machining tool is carried out, or, if the shape is outside the interval of acceptance, the machining tool is removed from the spindle head, and at least the machining tool holding device in the spindle head is cleaned, characterized in that the shape of the spindle head is determined during a rotation of the spindle head.

12. The method according to claim 11, wherein the cleaning of at least the machining tool holding device in the spindle head comprises blowing out the at least the machining tool holding device.

13. The method according to claim 11, wherein the rotation of the spindle head is a running-up rotation for machining.

14. A method for operating the working machine according to claim 1, where, first of all, the machining tool is set in the spindle head and is clamped there in a machining tool holding device in the spindle head, then the shape of the spindle head is determined by the measuring device, the determined shape is evaluated by an evaluating device, and, if the shape is within an interval of acceptance, machining of a work piece by the machining tool is carried out, or, if the shape is outside the interval of acceptance, the machining tool is removed from the spindle head, and the spindle is cleaned altogether.

15. The method according to claim 14, wherein the cleaning of the spindle comprises blowing out or off the spindle.

16. A working machine with a machining tool which can be set in a spindle head of a working spindle, a monitoring device being provided which monitors the shape of the spindle head, wherein the monitoring device comprises at least one measuring device, and said at least one measuring device is provided at a surface area of the spindle head and the measuring device records and indicates deformations occurring at the surface area because of a balance error, and transfers information related to the deformations to a control or an alarm.

\* \* \* \* \*